US008871689B2

(12) United States Patent
Watson et al.

(10) Patent No.: US 8,871,689 B2
(45) Date of Patent: Oct. 28, 2014

(54) DRILLING FLUID ADDITIVE AND METHODS OF STABILIZING KAOLINITE FINES MIGRATION

(75) Inventors: Russell B. Watson, Stavanger (NO); Patrick Viste, Sola (NO); Niall Fleming, Haus (NO); Kari Ramstad, Bergen (NO); Anne Mette Mathisen, Nesttun (NO); Nils Kaageson-Loe, Sandnes (NO)

(73) Assignees: Schlumberger Norge AS, Tananger (NO); Statoil ASA, Stavanger (NO)

( * ) Notice: Subject to any disclaimer, the term of this patent is extended or adjusted under 35 U.S.C. 154(b) by 788 days.

(21) Appl. No.: 12/742,815

(22) PCT Filed: Nov. 27, 2008

(86) PCT No.: PCT/IB2008/003899
§ 371 (c)(1),
(2), (4) Date: Sep. 29, 2010

(87) PCT Pub. No.: WO2009/083801
PCT Pub. Date: Jul. 9, 2009

(65) Prior Publication Data
US 2011/0021384 A1 Jan. 27, 2011

Related U.S. Application Data

(60) Provisional application No. 60/988,698, filed on Nov. 16, 2007.

(51) Int. Cl.
C09K 8/035 (2006.01)
C09K 8/12 (2006.01)
C09K 8/32 (2006.01)
C09K 8/508 (2006.01)

(52) U.S. Cl.
CPC ... *C09K 8/12* (2013.01); *C09K 8/32* (2013.01); *C09K 8/5086* (2013.01)
USPC ........... 507/127; 507/138; 507/233; 507/234; 507/265; 175/65

(58) Field of Classification Search
None
See application file for complete search history.

(56) References Cited

U.S. PATENT DOCUMENTS

2005/0045384 A1* 3/2005 Nguyen ..................... 175/72
2006/0264332 A1* 11/2006 Welton et al. ............... 507/203

FOREIGN PATENT DOCUMENTS

| GB | 2 419 614 A | 5/2006 |
| WO | 2005/019599 A1 | 3/2005 |
| WO | 2006/123143 A1 | 11/2006 |

OTHER PUBLICATIONS

Office Action issued in corresponding Eurasian Application No. 201070617 dated Feb. 2, 2012 (3 pages).
Office Action issued in corresponding Australian Application No. 2008345421 dated Feb. 16, 2012 (2 pages).
Office Action issued in corresponding European Application No. 08868569.8 dated Apr. 19, 2012.
Official Action issued in corresponding Eurasian Application No. 201070617 dated Jun. 7, 2012 (3 pages).
First Office Action issued in corresponding Chinese Patent Application No. 200880123820.2, dated Aug. 31, 2012, with English translation (15 pages).
Official Action issued in corresponding Eurasian Application No. 201070617 dated Nov. 12, 2012, with English translation (2 pages).
Office Action issued in corresponding Australian Application No. 2008345421 datd Feb. 22, 2011 (2 pages).
International Search Report issued in PCT/IB2008/003899, mailed on Sep. 22, 2009, 3 pages.
Written Opinion issued in PCT/IB2008/003899, mailed on Sep. 22, 2009, 6 pages.
Official Action issued in corresponding Eurasian Application No. 201070617/13 with English language letter reporting the same dated Apr. 19, 2013 (3 pages).
Second Office Action issued in corresponding Chinese Application No. 20080123820.2 dated Feb. 16, 2013 (9 pages).

\* cited by examiner

*Primary Examiner* — John J Figueroa
(74) *Attorney, Agent, or Firm* — Osha • Liang LLP

(57) ABSTRACT

A method of drilling is disclosed and includes pumping a wellbore fluid into a wellbore through an earth formation, wherein the wellbore fluid comprises a base fluid and a surface active agent capable of altering wettability of fines located in the earth formation, and allowing filtration of at least a portion of the wellbore fluid into the earth formation.

6 Claims, No Drawings

DRILLING FLUID ADDITIVE AND METHODS OF STABILIZING KAOLINITE FINES MIGRATION

BACKGROUND OF INVENTION

1. Field of the Invention

Embodiments disclosed herein relate generally to fluids for use in reducing the migration of native fines in a formation towards the wellbore and subsequent plugging of pores. In particular, embodiments disclosed herein relate to kaolinite fines migration inhibition agents in wellbore fluids and methods for their use in wellbore operations.

2. Background Art

Hydrocarbon fluids, such as oil and natural gas, and other desirable formation fluids are obtained from a subterranean geologic formation, i.e., a reservoir, by drilling a well that penetrates the formation zone that contains the desired fluid. It is desirable to maximize the rate of production and the overall amount of hydrocarbon flow from the formation to the surface. One of the factors that influence the rate of hydrocarbon production is the permeability of the formation. The permeability of the formation depends on rock type, pore size, and internal capillaries in the formation. Any constriction in the capillaries or blockage of the pores will cause a reduction in the permeability of the formation and thus reduce the rate of hydrocarbon production.

Pore blockage may result from native fines migration through the formation. Specifically, native fines migration results from both fluid and hydrocarbon movement through the formation. Native fines are most likely to migrate by flowing with the phase that wets them. While some fines are found to be water-wet and thus migrate when a mobile water phase is present, others are oil-wet and flow with a hydrocarbon stream. Such fines migration often results in formation damage due to the fines plugging pores, blocking flow paths, and inhibiting potential production from the well.

Formation damage can result from several different factors, including mechanisms resulting from the nature of a reservoir and from production from that reservoir. The most difficult mechanisms to prevent are those caused by a combination of the two. These mechanisms can be considered "natural" and affect productivity regardless of the presence of drilling and completion fluids. Early treatment of natural formation damage is critical as it is extremely expensive to solve remedially with post production chemical floods. Natural formation damage, for example, results from organic and inorganic precipitation resulting from a reduction of pressure in the near wellbore region or the migration of native fines towards the wellbore and subsequent plugging of pores and blockage of flow paths. In particular, migration of kaolinite fines reduces well productivity by causing particles suspended in the production fluid to plug pores near the wellbore.

Kaolinite is typically described as hydrous aluminum silicate clay with an extended sheet structure which can be regarded as having two constituents, a layer of tetrahedral $SiO_4$ and a layer of octahedral $OH^-$. A significant development in the study of treating kaolinite migration in formations was the realization that oil flow causes the most significant kaolinite migration because the kaolinite fines are mixed to oil-wet. Kaolinite has a very high surface area compared to its volume, and thus is easily migrated through the pore network by flowing with the phase that wets it. Further, fine particles tend to remain in the phase that wets them. This explains why kaolinite clay is seen to migrate to oil flow. Kaolinite has an unusual wettability distribution due to the two wettability environments on the mineral surface, thus making migration prevention complex. Because the near wellbore area sees the highest flow rates during production, this area is most sensitive to velocity induced kaolinite formation damage.

Previous attempts and known methods of solving the problem of fines migration have included remediative methods such as the reverse pumping of oil back into the formation as well as treating the formation with an acid solution adapted to dissolve the fines. These attempts, however, are remediative and thus result in inefficient production from the well and excessive downtime costs.

Accordingly, there exists a need for a preventative treatment that effectively minimizes formation damage due to fines migration without the downtime costs associated with the conventional remediative treatments.

SUMMARY OF INVENTION

A method of drilling, including pumping a wellbore fluid into a wellbore through an earth formation, wherein the wellbore fluid comprises a base fluid and a surface active agent capable of altering wettability of fines located in the earth formation, and allowing filtration of at least a portion of the wellbore fluid into the earth formation.

A method of drilling, including pumping a wellbore fluid into a wellbore through an earth formation, wherein the wellbore fluid comprises a base fluid and a fixation agent capable of fixating fines located in the earth formation, and allowing filtration of at least a portion of the wellbore fluid into the earth formation.

A method of drilling, including pumping a wellbore fluid into a wellbore through an earth formation, wherein the wellbore fluid comprises a base fluid, a surface active agent capable of altering wettability of fines, and a fixation agent capable of fixating fines located in the earth formation, and allowing filtration of at least a portion of the wellbore fluid into the earth formation.

A wellbore fluid, including a base fluid, a surface active agent capable of altering wettability of fines located in an earth formation, and a fixation agent capable of fixating fines located in an earth formation.

DETAILED DESCRIPTION

In one aspect, embodiments disclosed herein relate to wellbore fluids designed to minimize native fines migration and methods of use thereof. In particular, embodiments disclosed herein relate to drilling with a wellbore fluid that includes a base fluid, a fixation agent capable of fixating fines located in the earth formation, and/or a surface active agent capable of altering wettability of fines located in the earth formation; and allowing some filtration of the wellbore fluid into the earth formation.

As mentioned above, formation damage from fines migration results from a combination of the nature of the reservoir (i.e., the presence of fines) and from production from that reservoir (i.e., fluid flow carrying fines). Specifically, the mechanism of kaolinite fines migration is thought to occur by mixing fines to be oil wet such that the fines migrate with hydrocarbon flow and subsequently plug pores and decrease oil production.

Kaolinite is typically described as hydrous aluminum silicate clay with an extended sheet structure which can be regarded as having two constituents. A layer of tetrahedral $SiO_4$ and a layer of octahedral $OH^-$ form pseudo-hexagonal plates, resulting in aggregates of booklets and vermiforms (flocculated house of cards). The chemical composition of kaolinite is subject to little variation and generally has low cation exchange capacity when compared with other clays.

Due to the kaolinite structure, asphaltenes and other hydrocarbon materials will adsorb onto the surface thereof, rendering the clays oil-wet, whereas most other clay types are water wet. Specifically, the OH⁻ surface of the kaolinite is sensitive to the contact with asphaltenes, while the Si environment of the kaolinite remains insensitive to the contact. For Illite, the Si and Al environments are in each case not sensitive to the adsorption, rendering them water wet. Thus, the OH⁻ surface of the kaolinite influences the oil wettability of the kaolinite fines. Reservoir formations containing clays of large specific surfaces, such as kaolinite, can initially adsorb and retain polar asphaltenes rapidly. Accordingly, distribution of kaolinite within a formation strongly influences the distribution of oil in the reservoir due to the partial or total oil wetness of kaolinite.

Moreover, because kaolinite has a very high surface area compared to its volume, it is easily migrated through the pore network by flowing with the phase that wets it. Further, fine particles tend to remain in the phase that wets them. These observations explain why Kaolinite clay is seen to migrate in the oil flow. As the near wellbore area sees the highest flow rates of oil (and fines) through its channels during production, this is the area which is most sensitive to velocity induced kaolinite formation damage.

The inventors of the present disclosure have advantageously discovered that drilling fluids may be used to treat the near wellbore area during drilling. Thus, by allowing a drilling fluid containing additives designed to combat fines migration, early treatment of the formation may stabilize the fines in the near wellbore area before they have a chance to migrate, reducing or preventing the damage caused by migration of kaolinite during production, rather than remediating such damage after it has already occurred.

As kaolinite can have an unusual wettability distribution due to the two wettability environments on the mineral surface, migration prevention is complex. In some embodiments, a drilling fluid additive designed to alter the wettability of the kaolinite clay from oil wet to water wet may be used to reduce kaolinite fines migration. In other embodiments, a different drilling fluid additive designed to treat the surface of the mineral and fix the plates together may be used to reduce kaolinite fines migration. In yet other embodiments, both a drilling fluid additive designed to alter the wettability of the kaolinite clay from oil wet to water wet and an additive designed to treat the surface of the mineral and fix the plates together may be used in combination.

The inventors of the present disclosure have advantageously discovered that the addition of at least one of the drilling fluid additives mentioned above into a drilling fluid (which contacts the near wellbore area by filtration into the formation during drilling) to treat the fines before mass fines migration has begun, may protect the fines from the oil flow. Specifically, in one embodiment disclosed herein, adding a surface active agent to the drilling fluids, which may filter into the near wellbore area to contact fines in this region, may enable the fines to achieve a water-wet state, thereby reducing the fines from migrating in the oil flow.

Surfactants or surface active agents have an amphiphilic molecular structure, that is, a structure that is polar (hydrophilic) at one end and nonpolar (lipophilic/hydrophobic) at the other. Generally, hydrophilic groups may be cationic (e.g., organic amines—especially with three hydrocarbon chains attached to the nitrogen atom), anionic (e.g., fatty acids or sulfates with hydrocarbon chains) or nonionic (organic compounds with oxygen containing groups such as alcohols, esters and ethers) while hydrophobic or lipophilic groups may be large, straight or branched chain hydrocarbons, cyclic hydrocarbons, aromatic hydrocarbons, and/or combinations thereof.

Depending on the type of mineral fines to be altered, a surface active agent having the appropriate HLB may be selected. The term "HLB" (Hydrophilic Lipophilic Balance) refers to the ratio of the hydrophilicity of the polar groups of the surface-active molecules to the hydrophobicity of the lipophilic part of the same molecules. In some embodiments, it may be desirable to have an HLB ranging from 7 to 9 to render the fines water-wet.

Surface active agents suitable for use in the drilling fluid of the present disclosure may include, for example, fatty alcohol ethoxylates, fatty acid soaps, alkyl sulphates, alkyl ethoxylate sulphates, alkyl sulphonates, and alkyl phosphates, and mixtures thereof. Further, one of ordinary skill would appreciate that this list is not exhaustive, and that other surface active agents may be used in accordance with embodiments of the present disclosure. In a particular embodiment, a non-emulsifying surface active agent may be desirable because it may allow for the wettability of the fines to be altered without the surfactant interfering with the oil flow. Surface active agents such as those listed above may be used, for example, at about 0.1 to 15% by weight of the fluid, which is sufficient for most applications. However, one of ordinary skill in the art would appreciate that in other embodiments, more or less may be used.

One of ordinary skill in the art will recognize that selection of the surface active agent may depend on a variety of factors. In particular, the selection of the surface active agent may be related to the desired HLB range, as well as the properties of the target fines, the properties of the drilling fluid being used, the commercial availability of the surface active agent, and downhole conditions, etc. Additionally, consideration may be given to the effects the surface active agent may have on the drilling fluid. These considerations include any change in pH or in HTHP fluid loss, as well as any foam production during the mixing period.

The alteration from oil-wet to water-wet is not the only measure that the inventors have determined may be used to reduce the migration of fines toward the wellbore and subsequent plugging of pores during drilling fluid flow through the wellbore. For example, if an oil based drilling fluid is used, the need to alter the wettability of the fines to water-wet may not be required because the oil-wet fines will react with the oil based drilling fluid and any oil based additives contained therein. The inventors of the present disclosure have advantageously discovered that, for both water and oil based drilling fluids, use of a fixation additive to fixate the plates together (e.g., fixation of oil-wet and/or water-wet sites) may provide an alternative treatment to reduce the migration of fines toward the wellbore and subsequent plugging of pores during drilling fluid flow through the wellbore. Specifically, in one embodiment of the present disclosure, adding a fixation agent to the drilling fluid may allow for the fixation of hydroxyl groups on the kaolinite mineral together, thereby preventing the fines from migrating in the oil flow.

In a particular embodiment, fixation agents suitable for use in the drilling fluids of the present disclosure may include, for example, silane coupling agents such as compounds represented by the following structure:

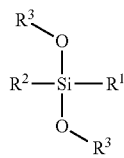

wherein $R^1$ may be selected from $C_1$ to $C_2$ hydrocarbon radical or $C_1$ to $C_4$ alkoxy groups; $R^2$ may be a $C_1$ to $C_{12}$ hydrocarbon radical; and $R^3$ may each be independently selected from $C_1$ to $C_4$ alkyl groups. As used herein, the term "hydrocarbon radical" is intended to refer to radicals primarily composed of carbon and hydrogen atoms, and thus encompasses aliphatic groups such as alkyl and alkenyl. Additionally, the term hydrocarbon radical also includes groups that include heteroatoms, and as such, may include functional groups such as amino groups, ethers, alkoxides, carbonyls, epoxides, amido groups, sulfides, sulfates, carbamates, etc., and combinations thereof. Inclusion of such polar groups may be particularly desirable to aid in dispersibility of the agents in water-based fluids and/or to aid in adsorption of the agent on clay surfaces. In a particular embodiment, a trialkoxysilane may be used.

Such fixation agent should be present in sufficient concentration to fix the pseudo-hexagonal plates of the kaolinite clay fines—formed from the layer of tetrahedral $SiO_4$ and the layer of octahedral $OH^-$—together in order to prevent them from migrating in the oil flow. Such plate fixation may likely result from the adsorption of the organosilicon compounds on the surface of the kaolinite clay particles, reaction with the plates to form stable Si—O—Si bonds upon contact with the kaolinite clay plates, and/or self-polymerization to produce a barrier at the kaolinite clay surface or within the kaolinite clay matrix, or combinations thereof. The reaction scheme for an exemplary fixation agent is shown below in Eq. 1.

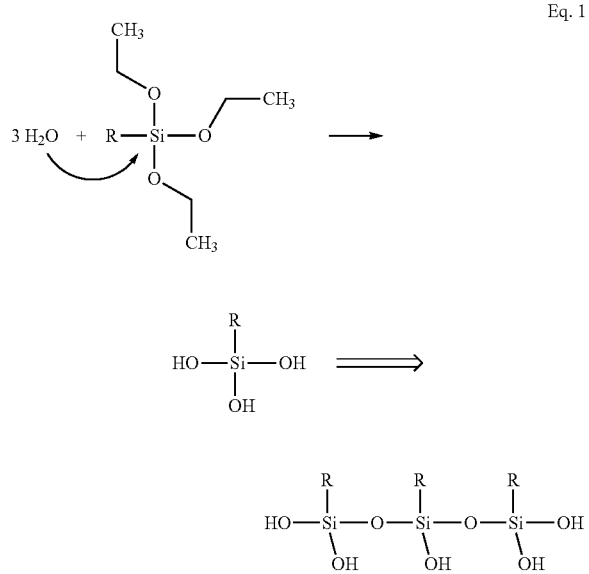

One postulated mechanism of fixation, wherein the kaolinite plates are fixed together at exposed hydroxyl sites, for example, is shown below in Eq. 2.

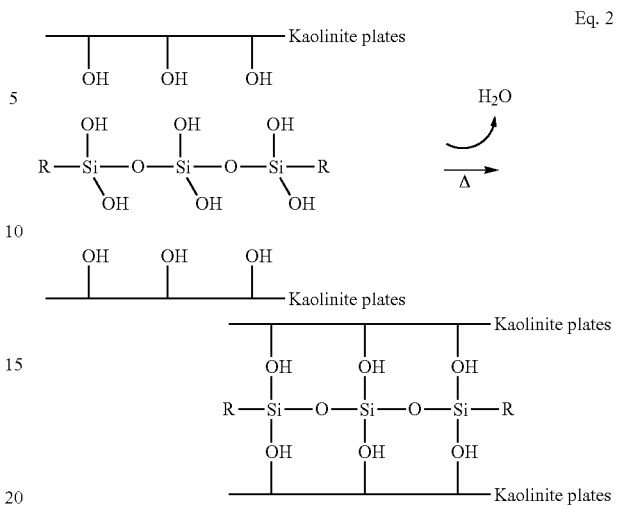

However, as indicated above, there are several postulated mechanisms by which the fixation agents of the present disclosure may interact with fines to reduce fine migration. Thus, no limitation on the scope of the present invention is intended by the specifics of the mechanism mentioned above.

Selection of the silane coupling agent may depend, in one aspect, on the type of drilling fluid in which the additive is being used. Thus, when using an oil-based or oleaginous drilling fluid, longer aliphatic hydrocarbon chains may be desirable. When using an aqueous drilling fluid, shorter chains and a polar group, such as 3-amino-propyl-triethoxysilane, may be desired. Further, one of ordinary skill in the art would appreciate that other fixation agents may be used in accordance with embodiments of the present disclosure. Such fixation agents may be used, for example, at about 0.1 to 15% by weight of the fluid, which is sufficient for most applications. However, one of ordinary skill in the art would appreciate that in other embodiments, more or less may be used.

One of ordinary skill in the art will recognize that selection of the fixation agent may depend on a variety of factors. In particular, the selection of the fixation agent may be related to the properties of the target fines, the properties of the drilling fluid being used, the commercial availability of the fixation agent, and downhole conditions, etc. Additionally, consideration is given to the effects the fixation agent may have on the drilling fluid. These considerations include any change in pH or in HTHP fluid loss Furthermore, the inventors of the present disclosure have advantageously discovered that the addition of both types of drilling fluid additives mentioned above into a drilling fluid (which contacts the near wellbore area by filtration into the formation during drilling) to treat the fines before mass fines migration has begun, may also protect the fines from the oil flow. Specifically, in one embodiment disclosed herein, addition of both a surface active agent and a fixation agent to a drilling fluid, which may filter into the near wellbore area to contact fines in this region, may enable the oil-wet fines to achieve a water-wet state as well as allow for the fixation of the kaolinite surface plates together, thereby reducing the fines from migrating in the oil flow according to the mechanisms described hereinbefore.

The base fluid into which the surface active agent and/or fixation agent may be added may generally be any oleaginous or non-oleaginous (aqueous) fluid phase that is compatible with the formulation of a drilling fluid and is compatible with the surface active agents and the fixation agents disclosed herein. Thus, the fluid phase may include either an aqueous fluid or an oleaginous fluid, or mixtures thereof.

An oleaginous base fluid may be a liquid, more preferably a natural or synthetic oil, and more preferably the oleaginous base fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof. The concentration of the oleaginous base fluid should be sufficient so that an invert emulsion forms and may be less than about 99% by volume of the invert emulsion. In one embodiment, the amount of oleaginous base fluid is from about 30% to about 95% by volume and more preferably about 40% to about 90% by volume of the invert emulsion fluid. The oleaginous base fluid, in one embodiment, may include at least 5% by volume of a material selected from the group including esters, ethers, acetals, dialkylcarbonates, hydrocarbons, and combinations thereof.

A non-oleaginous base fluid may preferably be selected from aqueous solutions including fresh water, sea water, a brine containing organic and/or inorganic dissolved salt compounds, liquids containing water-miscible organic compounds, and/or combinations thereof. In one illustrative embodiment, the non-oleaginous base fluid may be a brine solution including inorganic salts such as calcium halide salts, zinc halide salts, alkali metal halide salts, and the like. In another embodiment, the non-oleaginous base fluid may include an alkali formate such as potassium formate. If an invert emulsion is being formed, the amount of non-oleaginous fluid used is typically less than the theoretical limit needed for forming an invert emulsion. Thus, in one embodiment, the amount of non-oleaginous fluid is less that about 70% by volume, and preferably from about 1% to about 70% by volume. In another embodiment, the non-oleaginous fluid is preferably from about 5% to about 60% by volume of the invert emulsion fluid. However, in other embodiments, the fluid may be water-based, including no more than a small volume of an oleaginous fluid. Thus, the fluid phase may include either an aqueous fluid or an oleaginous fluid, or mixtures thereof.

In addition to the additives previously noted, one skilled in the art will appreciate that all different kinds of materials may also optionally be added to wellbore fluid formulations. In a particular embodiment, weighting agents, viscosifying agents, thinners, and/or fluid loss control agents may be added to the formulation in a concentration as rheologically and functionally required by drilling conditions.

For example, the wellbore fluids of the present disclosure may include a weight material or weighting agent in order to increase the density of the fluid. The primary purpose for such weighting materials is to increase the density of the fluid so as to prevent kick-backs and blow-outs. One of skill in the art should know and understand that the prevention of kick-backs and blow-outs is important to the safe day to day operations of a drilling rig. Thus the weighting agent may be added to the drilling fluid in a functionally effective amount largely dependent on the nature of the formation being drilled. Weight materials suitable for use in the formulation of the drilling fluids of the claimed subject matter may be generally selected from any type of weighting materials be it in solid, particulate form, suspended in solution, dissolved in the aqueous phase as part of the preparation process or added afterward during drilling. Weighting agents or density materials suitable for use the fluids disclosed herein include galena, hematite, magnetite, iron oxides, illmenite, barite, siderite, celestite, dolomite, calcite, and the like, as well as organic and inorganic salts, and mixtures and combinations of these compounds and similar such weight materials that may be used in the formulation of wellbore fluids. The quantity of such material added, if any, may depend upon the desired density of the final composition. Typically, weighting agent is added to result in a drilling fluid density of up to about 24 pounds per gallon. The weighting agent may be added up to 21 pounds per gallon in one embodiment, and up to 19.5 pounds per gallon in another embodiment.

The wellbore fluids may also include a viscosifying agent in order to alter or maintain the rheological properties of the fluid. The primary purpose for such viscosifying agents is to control the viscosity and potential changes in viscosity of the drilling fluid. Viscosity control is particularly important because often a subterranean formation may have a temperature significantly higher than the surface temperature. Thus a wellbore fluid may undergo temperature extremes of nearly freezing temperatures to nearly the boiling temperature of water or higher during the course of its transit from the surface to the drill bit and back. One of skill in the art should know and understand that such changes in temperature can result in significant changes in the rheological properties of fluids. Thus in order to control and/or moderate the rheology changes, viscosity agents and rheology control agents may be included in the formulation of the wellbore fluid. Viscosifying agents suitable for use in the formulation of the fluids of the present disclosure may be generally selected from any type of viscosifying agents suitable for use in aqueous based drilling fluids. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyarcylamides, and the like.

Thinners are typically added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures. Thinners may include materials such as lignosulfonates modified lignosulfonates, polyphosphates and tannins. In other embodiments, low molecular weight polyacrylates may also be added as thinners.

A variety of fluid loss control agents may be added to the wellbore fluids of the present disclosure that are generally selected from a group consisting of synthetic organic polymers, biopolymers, and mixtures thereof. The fluid loss control agents such as modified lignite, polymers, modified starches and modified celluloses may also be added to the water base drilling fluid system of this disclosure.

In addition to the components noted above, the wellbore fluids may also be formulated to include materials generically referred to as alkali reserve and alkali buffering agent. One of skill in the art should appreciate that lime is the principle alkali reserve agent utilized in formulating water-based wellbore fluids. Alkali buffering agents, such as cyclic organic amines, sterically hindered amines, amides of fatty acids and the like may also be included to serve as a buffer against the loss of the alkali reserve agent. The fluids may also contain anticorrosion agents as well to prevent corrosion of the metal components of the drilling operational equipment.

Other additives that could be present in the drilling fluids of the claimed subject matter include products such as lubricants, penetration rate enhancers, defoamers, fluid loss circulation products and so forth. Such compounds should be known to one of ordinary skill in the art of formulating both aqueous and oil based drilling fluids.

Thus, one embodiment of the present disclosure may include a method of stabilizing kaolinite fines migration, involving pumping a wellbore fluid into a wellbore through an earth formation and allowing some filtration of the wellbore fluid into the earth formation, in accordance with the teachings of this disclosure. Such filtration may allow the additives of the present disclosure included in the formulation to contact and interact with native fines to reduce or prevent subsequent fines migration during later production. In one embodiment, such a fluid would preferably include a base fluid and a surface active agent. In another embodiment, such a fluid would preferably include a base fluid and a fixation agent. In yet another embodiment, such a fluid would preferably include a base fluid, a surface active agent, and a fixation agent. The surface active agent and the fixation agent may be added to the wellbore fluid individually or as a premixed additive that comprises the surface active agent and/or fixation agent, as well as other optional components.

The methods of the present disclosure may be utilized in a variety of subterranean operations that involve subterranean drilling. Examples of suitable subterranean drilling operations include, but are not limited to, water well drilling, oil/gas well drilling, utilities drilling, tunneling, construction/installation of subterranean pipelines and service lines, and the like. These subterranean drilling operations may be utilized, inter alia, to drill a wellbore in an earth formation, or to stimulate the production of fluids from an earth formation, as well as or for a number of other purposes. In certain embodiments, the present disclosure provides methods of drilling at least a portion of a wellbore to penetrate an earth formation with the drilling fluids disclosed herein.

Wellbore fluids of embodiments of this disclosure may be used in drilling, completion, workover operations, etc. using conventional techniques known in the art. Additionally, one skilled in the art would recognize that such wellbore fluids may be prepared with a large variety of formulations. Specific formulations may depend on the stage in which the fluid is being used, for example, depending on the depth and/or the composition of the formation. The drilling fluids described above may be adapted to provide improved drilling fluids under conditions of high temperature and pressure, such as those encountered in deep wells, where high densities are required. Further, one skilled in the art would also appreciate that other additives known in the art may be added to the drilling fluids of the present disclosure without departing from the scope of the present disclosure.

EXAMPLE

The following example is submitted for the purpose of illustrating the advantages of the kaolinite fines stabilization agents of the present disclosure and for facilitating a better understanding of the present disclosure by those skilled in the art. Thus, the following example is submitted for illustrative purposes only and is not intended to limit the invention in any manner.

This example is submitted for the purpose of showing the comparative kaolinite fines stabilization effects of possible kaolinite fines stabilizing agents, including a non-emulsifying fatty alcohol ethoxylate surfactant and an organosilane fixing agent. The results of these tests are tabulated in Table 1 and set forth below. All of the samples tested were subjected to the procedures set forth in detail below.

Formulations of the drilling fluid were designed and tested after selection of the treatment to be carried out by the drilling fluid based on extensive research on kaolinite migration mechanisms. The first phase of testing was to see if the treatment chemicals affected the drilling fluid properties in any negative way. The second phase of testing was to determine the effectiveness of the treatment on outcrop core. The third phase was to determine the effectiveness of the treatment on reservoir core material from Oseberg Sør.

Drilling Fluid Tests (Phase One)

Each fluid was mixed using a Silverson mixer for optimal shear. The initial fluid properties were measured before the samples were dynamically aged (hot rolling ovens to simulate downhole conditions) in a pressurized cell (to avoid boiling). Fluid properties were also measured after the aging process to monitor the effect of temperature during time on the samples. Aging temperature was same as maximum reservoir temperature.

During the investigative phase, drilling fluids were tested for suitability and particular attention was paid to anything that caused the candidate drilling fluid to differ from the normal base drilling fluid. Of the drilling fluids that were tested, the fluid which displayed the most compatibility with the additional treatment chemicals was potassium formate. Any fluid formulation which did not perform in these tests according to standard drilling fluid requirements was removed from the remaining testing regime.

Filtration properties and pH for the fluids were checked after aging. Filtration was performed using an API HTHP (High Temperature High Pressure) cell. A total differential pressure of 500 psi (34.5 bar) and 110° C. was applied during the test. The initial fluid loss (spurt) was recorded along with total fluid loss after 30 minutes. The results are shown in Table 1, below.

TABLE 1

Potassium formate drilling fluids HTHP Fluid Loss results and pH

| | | Base fluid | 1% T1 | 3% T1 | 5% T1 | Base fluid | 1% T2 | 3% T2 | 5% T2 |
|---|---|---|---|---|---|---|---|---|---|
| HTHP: 60 micron | Temp | 110 | 110 | 110 | 110 | 110 | 110 | 110 | 110 |
| | dP, psi | 500 | 500 | 500 | 500 | 500 | 500 | 500 | 500 |
| | Spurt | 4.0 | 3.0 | 8 | 8 | 4.0 | 4.8 | 5.5 | 6.4 |
| | 30 min | 6.5 | 3.2 | 13 | 13.5 | 7.6 | 8.1 | 8.5 | 9.3 |
| | pH | 8.8 | 8.8 | 8.7 | 8.8 | 8.8 | 8.8 | 8.8 | 8.8 |

The addition of surfactants in a water-based drilling fluid was especially concerning with regards to foaming; some of the surfactants that were tested caused minor amounts of foam during the mixing period. However, the fluid, which passed all four phases, displayed no foaming characteristics. Other considerations were any change in pH and any change in HTHP fluid loss. The pH did not change significantly when comparing the base fluids and the fluids with treatments added. Addition of a water-based fixing agent did not affect the HTHP results significantly and the potassium formate results were reasonably consistent with only a minor increase in filtrate loss with increasing percent of the fixing agent. Addition of wetting surfactant, however, did affect the HTHP fluid loss results and more than doubled the result after 30 minutes (see Table 1).

Rheology was measured on the freshly made fluids and on aged fluids. To ensure that the additives did not negatively affect the rheology of the drilling fluids, the base fluid and the drilling fluid with the additives had rheology measured at 50° C. using a calibrated Fann 35 rheometer. The pH was also checked on each sample. All potassium formate formulations displayed very little alteration in rheology and were therefore qualified to go further in the testing.

Core Flood Tests—Blaxters Core (Phase Two)

Blaxters outcrop core material was selected for the initial formation damage return permeability tests to avoid using excessive amounts of formation core during the fluid development. Blaxters was selected due to its similarity with the Oseberg Sør formations particularly the volume and distribution of kaolinite clay. Scanning electron microscopy (SEM) was used to determine the distribution of kaolinite within the Oseberg Sør core samples and within the Blaxters core samples. It was found that the kaolinite had a patchy distribution resulting from alteration of feldspar grains within the sandstone matrix. XRD (X-ray Diffraction) showed that the percent of kaolinite in the Oseberg Sør Formations ranged from 7 to 15%, wherein 3 to 6% is less than 2 µm. The Blaxters core material had a kaolinite content of approximately 20%, with approximately 5% less then 2 µm. To ensure that the Blaxters core material was sensitive to kaolinite migration, rate dependency tests were performed on the core which had been prepared to Swi and aged with filtered dead crude oil. The result was that Blaxters core displayed similar characteristic fines migration to the Oseberg Sør formations; however, the flow rate needed to be slightly higher. Increased aging times considerably decreased the flowrate required to cause formation damage (from 6 ml/min to 3 ml/min).

The cores were labeled with a wellbore end (drilling fluid application end) and a formation end. For each core flood test the cores were loaded into the formation damage test apparatus at pressure and 110° C. (Oseberg Sør reservoir temperature) and prepared to irreducible water saturation at increasing rates until the differential pressure was seen to increase significantly, indicating migration. The drilling fluid was then applied followed by back flood at increasing rates with return permeability measurements recorded after each rate increase. The filtrate loss observed in each case was approximately 1 pore volume.

The return permeability tests that were performed on potassium formate drilling fluid formulations are presented in Table 2.

Return permeability results displayed a very convincing trend with results from potassium formate without additives not controlling the kaolinite fines migration and as can be seen in the potassium formate samples in Table 2 which displayed increasing damage after each increase in back flood rate.

The average return permeability with no additive is approximately 50%; this is in line with flooding results obtained from many laboratories testing Oseberg Sør core material with Oseberg Sør crude oil and no drilling fluid. It is also the same result that was obtained for the Blaxters core material aged in Oseberg Sør crude oil and flooded at the same rates. The samples with the fixing agent additive displayed an increase in permeability after each stage indicating much less fines migration and a significant filtercake cleanup. The samples displaying the most significant return permeability were the ones which had the surfactant additive with an average return permeability above 95%.

Middle Talbert Core (Phase Three)

Middle Tarbert core material from Oseberg Sør was tested and showed a significant decrease in permeability whilst flooding oil, even at low rates.

For testing the drilling fluid on reservoir core, it was decided to prepare the core to representative irreducible water saturation. The Middle Tarbert cores were prepared to Swi in an ultracentrifuge in pressure steps so as to avoid shocking the core. The ultracentrifuge ultimately created a 5 bar differential pressure across the core until no more water was produced out of the samples. The samples were then aged with Oseberg Sør crude oil at temperature and pressure before recording a base permeability measurement in the formation to wellbore direction. The maximum rate achievable before the onset of fines migration was noted from previous tests on the same core material and was not exceeded during the permeability measurements. The drilling fluid was then applied at overbalance to the core plug and the filtrate loss recorded. After the drilling fluid application, the core underwent a backflood where the Oseberg Sør crude oil was flooded at constant rates which were increased in increments and the change in differential pressure recorded. After each change in rate, a permeability measurement was recorded at low rates.

As linear core floods were performed, the interstitial velocity was similar along the length of the core and there was no reduction in interstitial velocity further away from the wellbore end. Considering this fact, it was decided that the treatment needed to invade a minimum of one pore volume to have a noticeable effect on the migration potential further from the wellbore.

Advantageously, drilling with wellbore fluids formulated in accordance with embodiments of the present disclosure may provide for the stabilization of kaolinite fines within a formation. Moreover, embodiments of the present disclosure may provide for the minimization of the migration of such

TABLE 2

Average Return Permeability Results for the Potassium Formate Fluid With and Without Additives

| Analysis Program | Formation | Ko 1 @ Swi, Res Con | % Return | Ko 2 2 ml/min Backflow | % Return | Ko 3 4 ml/min Backflow | % Return | Ko 4 7 ml/min Backflow | % Return |
|---|---|---|---|---|---|---|---|---|---|
| K Formate + T1 | Blaxter | 61 | 100% | 43 | 71% | 50 | 83% | 58 | 96% |
| K Formate + T2 | Blaxter | 14.7 | 100% | 9.5 | 65% | 10.8 | 74% | 11.9 | 81% |
| K Formate | Blaxter | 15.6 | 100% | 9.1 | 58% | 7.7 | 50% | 7.9 | 51% | fines with hydrocarbon flow as well as the subsequent plugging of pores due to such fines migration, which may result in more efficient rate of hydrocarbon production and an increase in the overall amount of hydrocarbon flow from the formation to the surface.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wellbore fluid, consisting essentially of:
    a base fluid;
    a surface active agent capable of altering the wettability of fines located in an earth formation;
    a silane fixation agent capable of fixating fines located in an earth formation; and
    optionally at least one of a weighting agent, a viscosifying agent, a thinner, a fluid loss control agent, an alkali reserve, an alkali buffering agent, an anticorrosion agent, a lubricant, a penetration rate enhancer, a defoamer and a fluid loss circulation product.

2. The wellbore fluid of claim 1, wherein the base fluid comprises at least one of an oleaginous and/or a non-oleaginous fluid.

3. The wellbore fluid of claim 1, wherein the surface active agent has an HLB in the range of 7 to 9.

4. The wellbore fluid of claim 1, wherein the surface active agent comprises a non-emulsifying fatty alcohol ethoxylate.

5. The wellbore fluid of claim 1, wherein the fixation agent comprises a compound represented by the following structure:

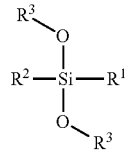

wherein $R^1$ may be selected from $C_1$ to $C_2$ hydrocarbon radical or $C_1$ to $C_4$ alkoxy groups, $R^2$ may be a $C_1$ to $C_{12}$ hydrocarbon radical, and $R^3$ may each be independently selected from $C_1$ to $C_4$ alkyl groups.

6. The wellbore fluid of claim 5, wherein the fixation agent comprises a 3-amino-propyl-triethoxysilane.

* * * * *